United States Patent
Walsten et al.

(10) Patent No.: US 6,224,038 B1
(45) Date of Patent: May 1, 2001

(54) FISH TAPE REEL ASSEMBLY

(75) Inventors: Dean R. Walsten, Slinger; David L. Wiesemann, Pewaukee; Timothy E. O'Connell, Hartland; Stephen J. Skeels, Milwaukee, all of WI (US)

(73) Assignee: Actuant Corporation, Milwaukee, WI (US)

( * ) Notice: Subject to any disclaimer, the term of this patent is extended or adjusted under 35 U.S.C. 154(b) by 0 days.

(21) Appl. No.: 09/373,181

(22) Filed: Aug. 12, 1999

(51) Int. Cl.$^7$ ..................................................... B65H 59/00
(52) U.S. Cl. ........................................................ 254/134.3 FT
(58) Field of Search ................................ 242/395, 395.1; 254/134.3 FT, 134.3 R; 15/104.33; 119/796

(56) References Cited

U.S. PATENT DOCUMENTS

| D. 341,329 | 11/1993 | Morris . |
| D. 351,561 | 10/1994 | Moffatt et al. . |
| D. 408,749 | 4/1999 | Walsten . |
| 1,592,030 | * 7/1926 | Langsner .................. 242/395.1 |
| 2,743,884 | * 5/1956 | Briggs ..................... 254/134.3 FT |
| 3,528,644 | * 9/1970 | Scott ...................... 254/134.3 FT |
| 4,056,859 | * 11/1977 | Pace ....................... 254/134.3 FT |
| 4,092,780 | 6/1978 | Trethewey et al. . |
| 4,164,334 | 8/1979 | Rathbun et al. . |
| 4,215,828 | * 8/1980 | Rathbun et al. ................. 242/395.1 |
| 4,251,038 | 2/1981 | Gename . |
| 5,377,626 | * 1/1995 | Kilsby et al. ..................... 119/796 |
| 6,016,609 | * 1/2000 | Donovan et al. ........... 254/134.3 FT |

OTHER PUBLICATIONS

Applicant's Exhibit A—Two–page photocopy of Sears 100 Ft. $^9$39005 tape measure, admitted prior art.
Applicant's Exhibit B—Two–page photocopy of Vitakraft flexi 2–5 Automatic Retractable Dog Leash, admitted prior art.
Applicant's Exhibit C—Two–page photocopy of Plumb 100' tape measure, PL1706, admitted prior art.

* cited by examiner

Primary Examiner—Robert C. Watson
(74) Attorney, Agent, or Firm—Quarles & Brady LLP

(57) ABSTRACT

A fish tape reel assembly includes a housing having a peripheral wall defining an outer wall of a cavity having a center. A housing handle is attached to the peripheral wall, and a fish tape cassette is rotatably mounted in the cavity. The cassette rotates in the cavity to wind and unwind fish tape thereon to retract or extend the tape to and from the housing in a feed direction which is perpendicular to the housing handle. A handle on the cassette pivots to lock the cassette into a locked position which prevents the cassette from rotating. A fish tape end piece is wedge shaped to create a path between surfaces requiring separation.

7 Claims, 5 Drawing Sheets

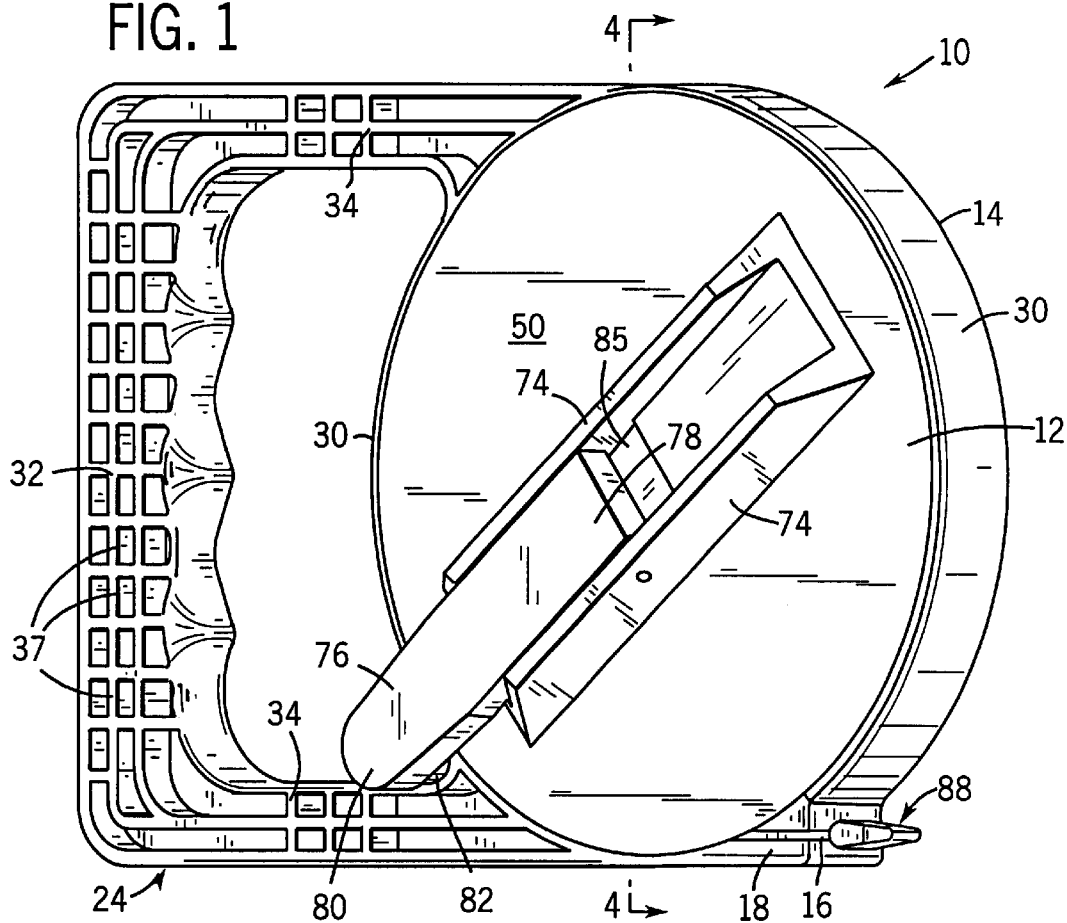
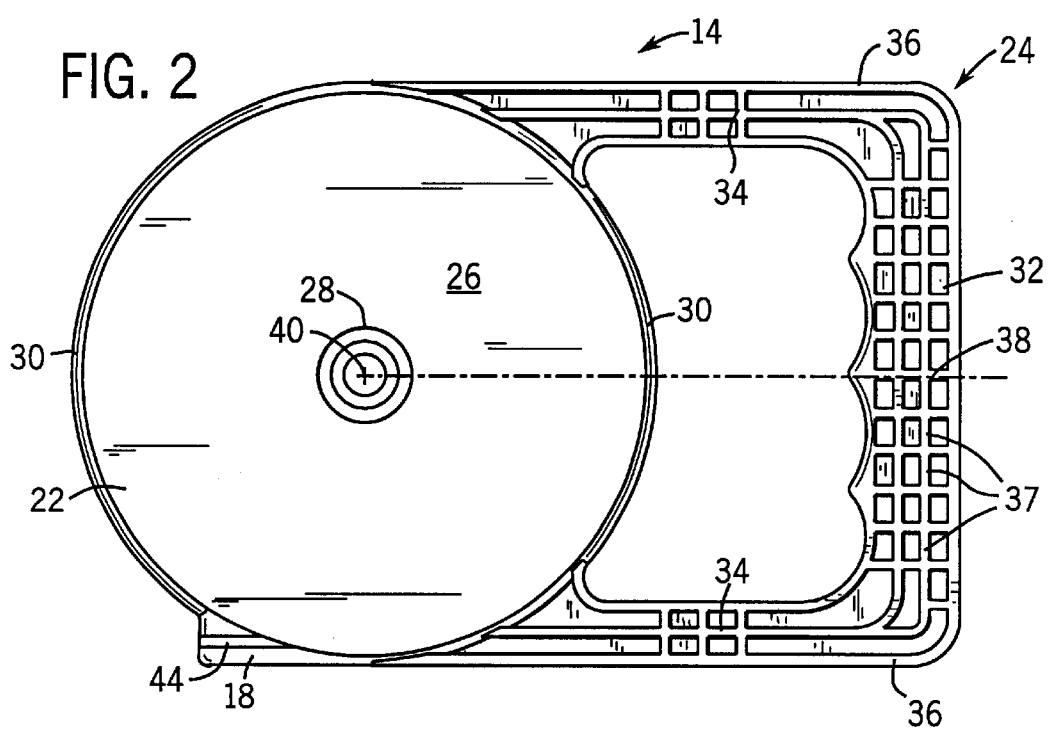

FISH TAPE REEL ASSEMBLY

CROSS REFERENCES TO RELATED APPLICATIONS

Not applicable.

STATEMENT REGARDING FEDERALLY SPONSORED RESEARCH

Not applicable.

FIELD OF THE INVENTION

This invention relates to fish tapes of the type used by electricians to pull wire through conduit or other spaces, and more particularly to the fish tape reel assembly and end assembly.

BACKGROUND OF THE INVENTION

A fish tape is an elongated wire or nonconductive flexible rod or flat tape typically used to install wire in conduit, through existing walls, or between surfaces. Because typical electrical wire is very flexible, pushing it through long lengths of conduit is virtually impossible. Pulling wire along the desired path is much more effective.

In order to pull the wire, a fish tape, being more rigid than electrical wire, is pushed along the desired path. Once an end of the fish tape reaches the end of the desired path, the electrical wire is attached to an end assembly mounted to the fish tape end, and the fish tape is retrieved pulling the wire with it.

The fish tape is typically stored in a reel assembly, such as disclosed in U.S. Pat. No. 4,092,780 which stores the fish tape in a coil. The reel assembly disclosed in U.S. Pat. No. 4,092,780 includes a generally annular tape receiving chamber peripherally bound by a pair of axially opposed lips. The lips separate to permit winding and unwinding of the fish tape in the chamber. A handle having a tape passage is mounted between the lips which provides passage of the tape out of and in to the receiving chamber.

Another reel assembly known in the art includes a generally annular tape receiving chamber with inner and outer periphery walls. A tape passage formed on the inner periphery walls provides passage of the tape out of and in to the receiving chamber.

When loading tape into the above reel assemblies, the receiving chamber is disassembled in order to anchor one end of the tape to a chamber wall. The tape is then coiled in the chamber prior to reassembly, or the tape is wound into the chamber after assembly through the tape passage. In any event, this is a time consuming process.

In operation, when retrieving the fish tape with wires attached, the end assembly can become snagged. The user must grasp the fish tape to pull the tape with sufficient force to dislodge the tape. A significant force may be needed, exacerbated by the fact that the tape is typically stiff and of small cross-section, making it difficult to grasp.

Finally, the fish tape ends typically have a cylindrical end piece or are formed into a coil to which wire can be attached. These shapes are acceptable when the fish tape is fed through an unobstructed path, such as a conduit. However, when the path is between surfaces which may require separation, such as between a carpet and floor, the fish tape often encounters insurmountable obstacles. Thus multiple attempts to traverse the desired area are required prior to finding a path with sufficiently separated surfaces that will allow passage of the tape.

BRIEF SUMMARY OF THE INVENTION

The present invention is a fish tape reel assembly which includes a housing having a peripheral wall defining an outer wall of a cavity having a center. A handle is attached to the peripheral wall, and a fish tape cassette is rotatably mounted in the cavity. The cassette rotates in the cavity to wind and unwind fish tape thereon.

A general objective of the present invention is to provide a fish tape reel assembly which is easily loadable with fish tape. This objective is accomplished by providing a fish tape reel assembly that is loaded with fish tape by inserting a cassette containing fish tape into the housing.

Another objective of the present invention is to provide a fish tape reel assembly that aids in pulling a deployed fish tape. This objective is accomplished by providing a housing handle substantially perpendicular to the feed direction of the fish tape, and a locking mechanism for locking the fish tape from movement out of the housing. Pulling on the housing handle, when the fish tape reel assembly is in a locked position exerts a tensile force in the proper direction to pull the fish tape with a user's hand and wrist aligned and generally parallel to the feed direction of the tape.

Yet another objective of the present invention is to provide a fish tape end piece which will easily pass between two surfaces requiring separation. This objective is accomplished by providing a wedge shaped end piece having a leading edge thinner than a trailing edge.

These and other objects of the invention will become apparent from the following detailed description thereof when taken with the accompanying drawings of which:

BRIEF DESCRIPTION OF THE DRAWINGS

FIG. 1 is a top perspective view of a fish tape reel assembly in a locked position that employs the present invention;

FIG. 2 is a top plan view of the fish tape reel assembly housing of FIG. 1;

DETAILED DESCRIPTION OF THE PREFERRED EMBODIMENT

Figure 3:
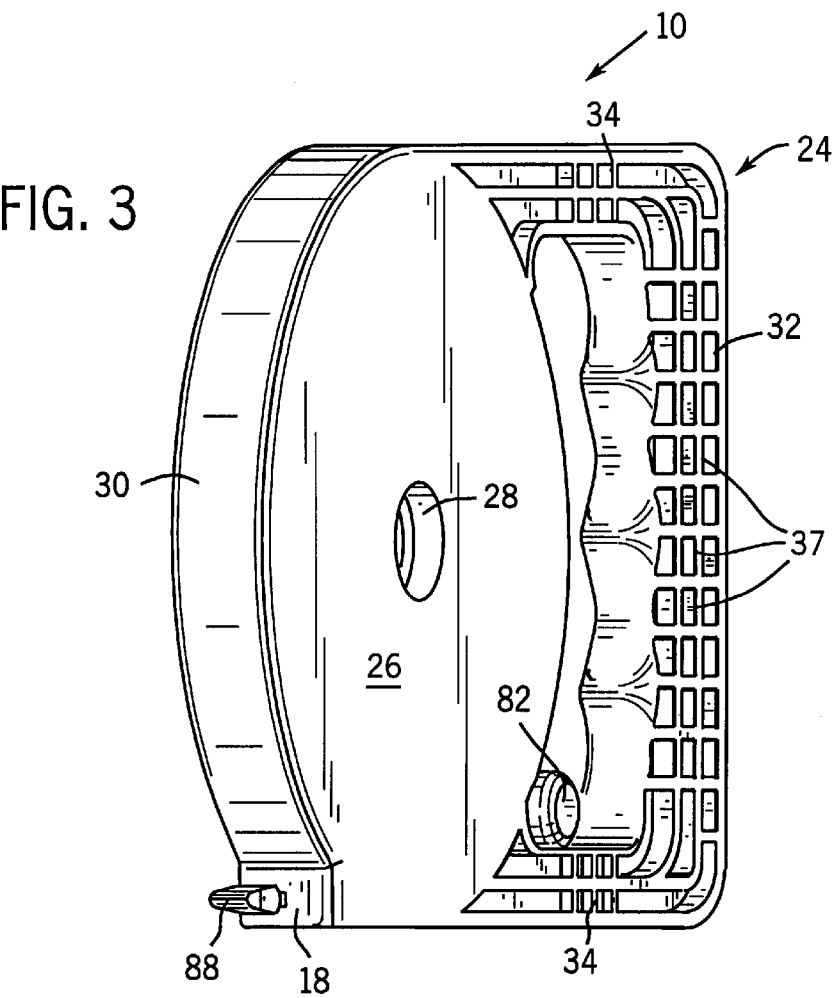
FIG. 3 is a bottom perspective view of the fish tape reel assembly of FIG. 1.

A fish tape reel assembly 10 has a housing 14 with a cavity 22 formed therein, and an integral carrying handle 24. A fish tape cassette 12 is rotatably mounted in the cavity 22, and contains fish tape 16. The cassette 12 has a cassette handle 76 which pivots between a locked position (shown in FIG. 1) and an unlocked position (shown in FIG. 9). In the unlocked position, a user rotates the cassette 12 to deploy or retrieve the tape 16. In the locked position, the user can pull on the carrying handle 24 to exert a significant pulling force on deployed tape 16. Preferably, the housing 14 and cassette 12 are formed from molded plastic, such as polypropylene and the like, using methods known in the art, such as injection molding and the like.

Figure 4:
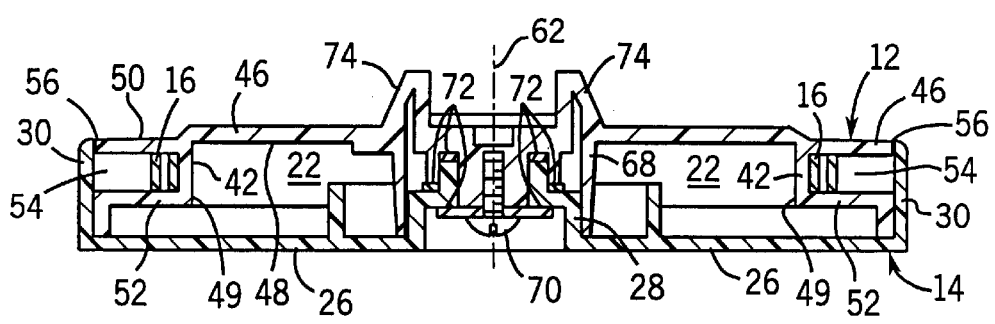
FIG. 4 is a cross-sectional view along line 4—4 of FIG. 1.

Referring now to FIGS. 3 and 4, the housing 14 receives the cassette 12 in the annular cavity 22 formed therein, and has a carrying handle 24 for carrying the assembly 10. The cavity 22 is defined in the housing 14 by a substantially circular back wall 26 with a centrally disposed hub 28 for rotatably mounting the fish tape cassette 12, and a periphery wall 30 extending substantially perpendicular to the back wall 26.

The carrying handle 24 has a grip 32 for grasping by the user, and is attached to the housing periphery wall 30 by arms 34 extending from opposing ends 36 of the grip 32. The grip 32 is substantially perpendicular to a radial line 38 extending from the circular back wall center 40 to the center of the handle 24. Preferably, the grip 32 and arms are formed as a single piece, and as an integral part of the housing periphery wall 30. Ribs 37 formed in the handle reduce the material required to form the handle without significantly reducing the handle structural integrity.

A fish tape guide 18 is formed as part of the housing periphery wall 30, and directs the fish tape 16 unwound from the cassette 12 away from the carrying handle 24, and substantially parallel to the radial line 38 extending from the circular back wall center 40. The guide 42 is formed as an integral part of the housing periphery wall 30, and has a slot 44 extending through the periphery wall 30 substantially parallel to the radial line 38.

The fish tape 16 is slipped into the slot 44 when the cassette 12 is mounted in the cavity 22, and it exits the housing cavity 22 through the slot 44 when the fish tape 16 is unwound from the cassette 12. By guiding the fish tape 16 away from the handle 24 which is substantially perpendicular to the extended tape 16, when the cassette 12 is in a locked position, a significant pulling force can be exerted on the tape 16 by pulling on the carrying handle 24, with the user's hand and wrist aligned, and the user's arm generally parallel to the radial line 38.

Figure 5:
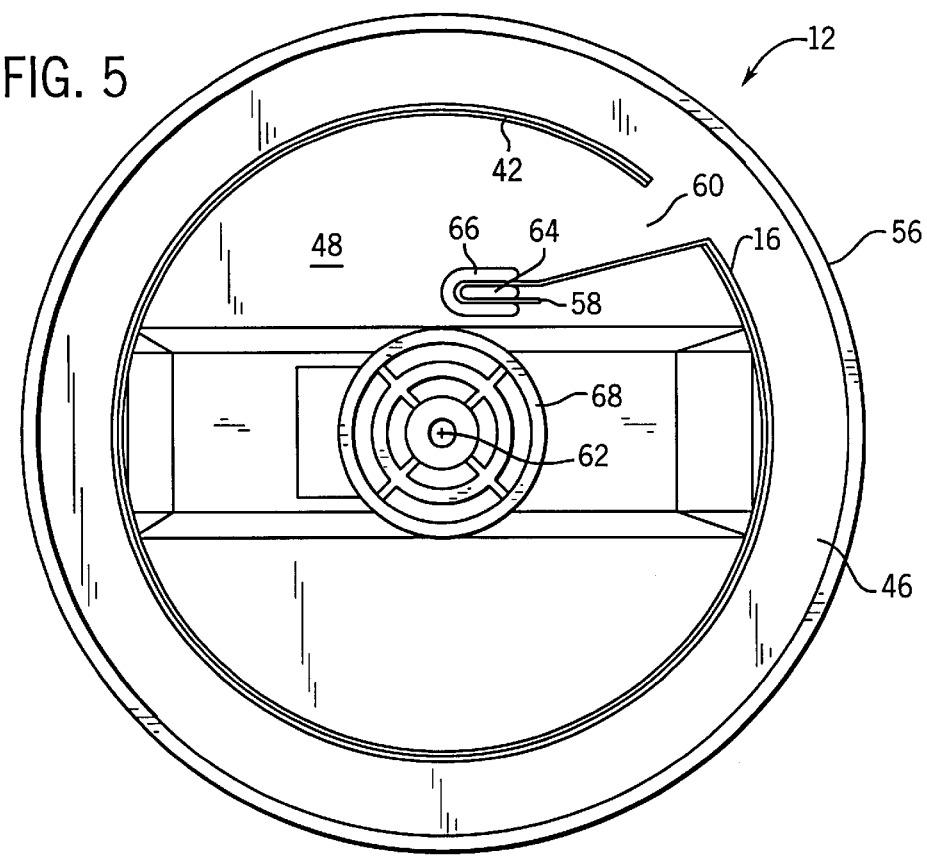
FIG. 5 is a bottom view of the fish tape reel assembly cassette of FIG. 1.
Figure 6:
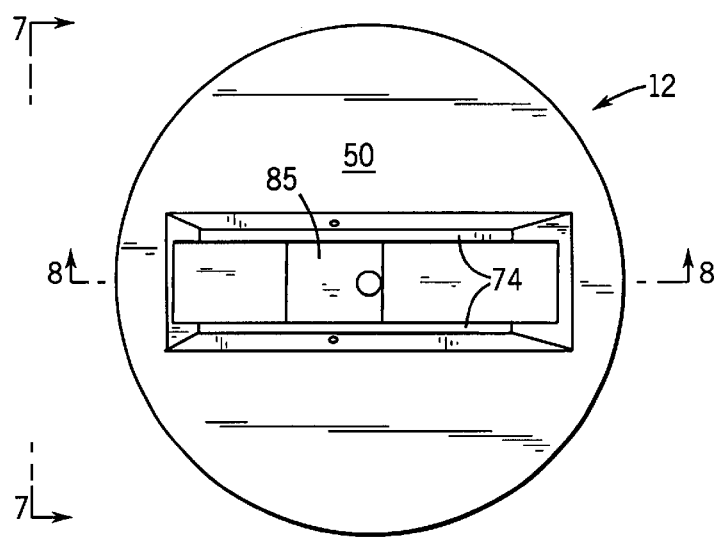
FIG. 6 is a top plan view of the fish tape reel assembly cassette of FIG. 1.
Figure 7:
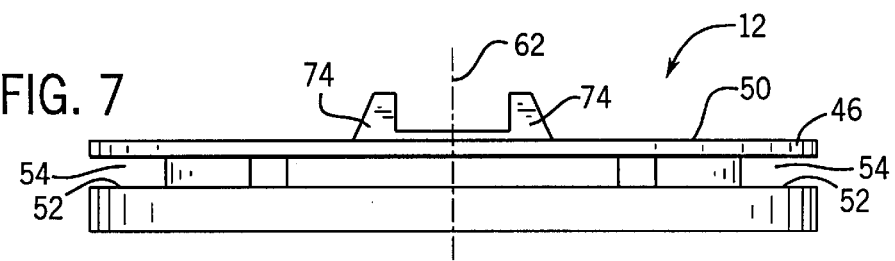
FIG. 7 is a side view along line 7—7 of FIG. 6
Figure 8:
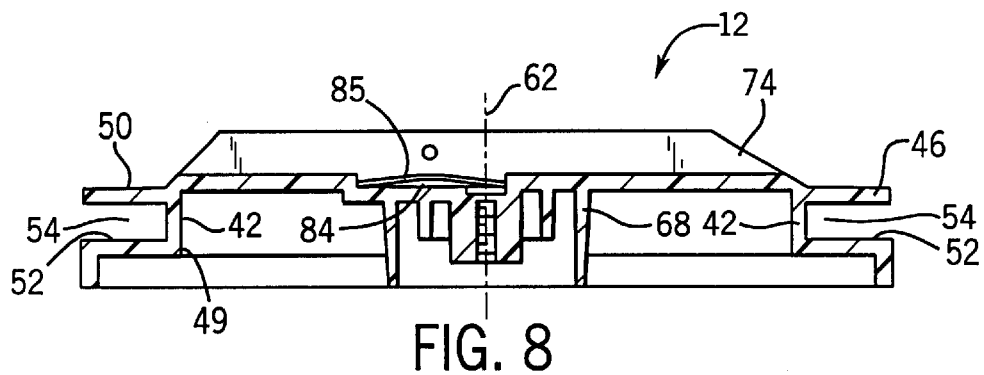
FIG. 8 is a cross-sectional side view along line 8—8 of FIG. 6.

Looking particularly at FIG. 5, the cassette 12 is rotatably mounted in the housing cavity 22, and has the fish tape 16 wound thereon. The cassette includes a disc shaped base 46 having an inner and outer surface 48, 50. The base 46 has a wall 42 extending substantially perpendicular from the base inner surface 48 which is joined to an inner radius 49 of an annular disc 52 to form a groove 54 in the cassette periphery 56 for receiving the fish tape 16. Only two coils of the tape 16 are illustrated, it being understood that any number of coils may be provided.

As shown in FIG. 5, the fish tape 16 has one end 58 anchored to the cassette to prevent it from completely slipping out of the fish tape reel assembly 10. The fish tape anchor end 58 is inserted through an opening 60 in the cassette wall 42, and looped around a tab 64 extending from the base inner surface 48. A U-shaped extension 66 spaced from the tab 64 wraps around the tab 64 to prevent the fish tape 16 from slipping off of the tab 64.

Looking at FIGS. 6–9, a hub 68 centrally disposed on the base inner surface 48 mates with the housing hub 28 to rotatably mount the cassette 12 to the housing 14. A bolt 70 threadably engaging the cassette base hub 68, and extending through the housing hub 28 concentric with the cassette center 62 retains the cassette 12 in the housing cavity 22. Low friction washers 72, such as formed from brass, separate the hubs 28, 68, and the bolt 70 to reduce friction when rotating the cassette 12 in the housing cavity 22.

The base outer surface 50 has a pair of substantially parallel ribs 74 extending substantially perpendicular to the cassette base outer surface 50. The ribs 74 are centrally disposed on the base outer surface 50, and bracket the cassette center 62 to provide mounting surfaces for a cassette handle 76.

Figure 9:
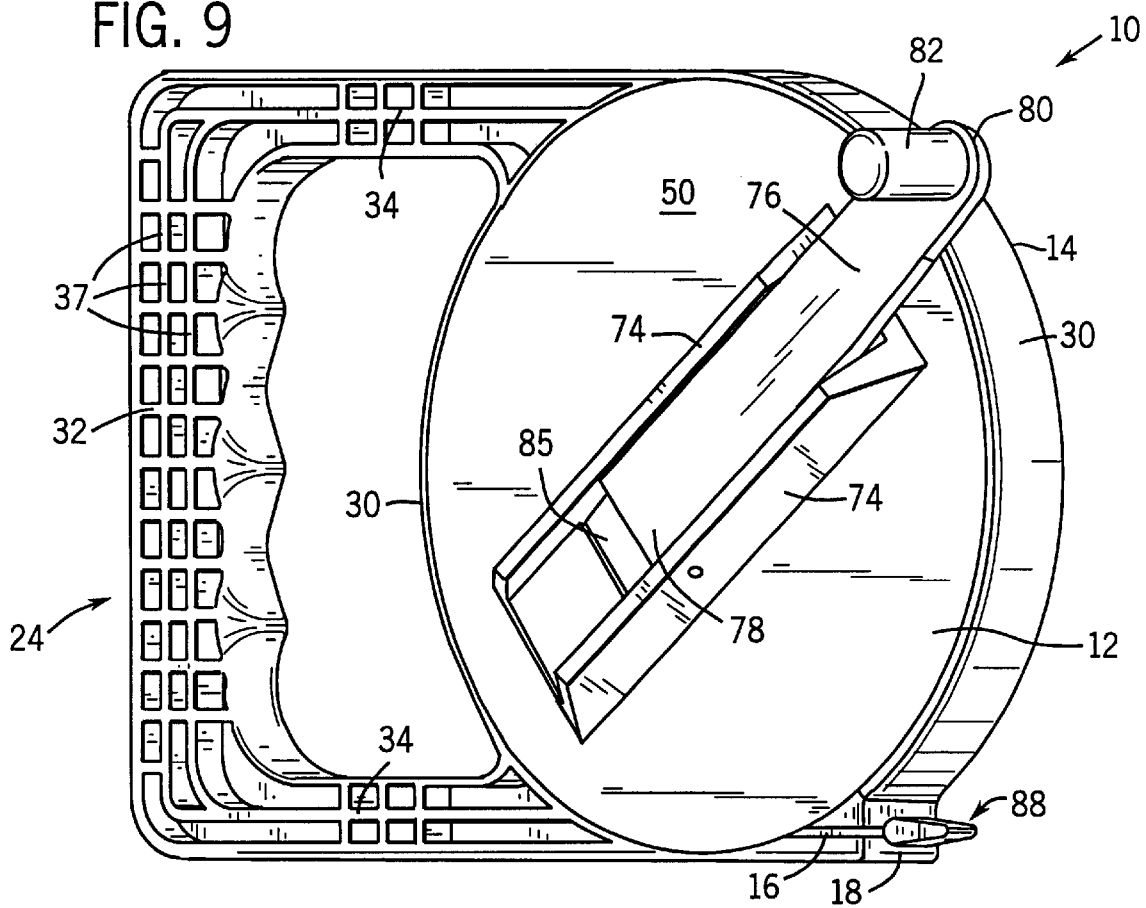
FIG. 9 is a top perspective view of the fish tape reel assembly of FIG. 1 in an unlocked position.

The cassette handle 76 is interposed between the ribs 74, and has one end 78 pivotally mounted thereto to rotate the cassette 12 when in the unlocked position (shown in FIG. 9). The other end 80 of the cassette handle 76 has a knob 82 for grasping by the user when rotating the cassette 12. In the locked position, shown in FIGS. 1 and 3, the knob 82 engages the housing carrying handle 24 to prevent rotation of the cassette 12, thus locking the cassette from unwinding any additional fish tape 16. The locked position is particularly advantageous when pulling on the carrying handle 24 to dislodge the tape 16 from a snag.

Referring back to FIGS. 1 and 6–9, a depression 84 (shown in FIG. 8) formed in the base outer surface 50 between the ribs 74, and beneath the cassette handle pivotally connected end 78 provides clearance for the cassette handle 76 when pivoting. The clearance allows the cassette handle 76 to pivot 180° between the locked position to the unlocked position. Of course, any method known in the art to provide clearance for the cassette handle 76, such as shortening the handle end 78, may be used without departing from the scope of the present invention.

A leaf spring 85 disposed in the depression biases the handle 76 in the locked or unlocked position. Biasing the handle 76 prevents it from inadvertently moving from the locked position to the unlocked position, and thus unintentionally dispensing tape 16.

The fish tape 16 is preferably an elongated flat metal or fiberglass tape wrapped around the cassette 12 in the groove 54. Although a flat tape is preferred, any shaped tape, such as a round tape, may be used without departing from the scope of the present invention. The tape anchor end 58 is anchored to the tab 64 extending from the cassette base inner surface 48. A tape free end 86 extends through the fish tape guide 52, and has an end piece 88 affixed thereto.

Figure 10:
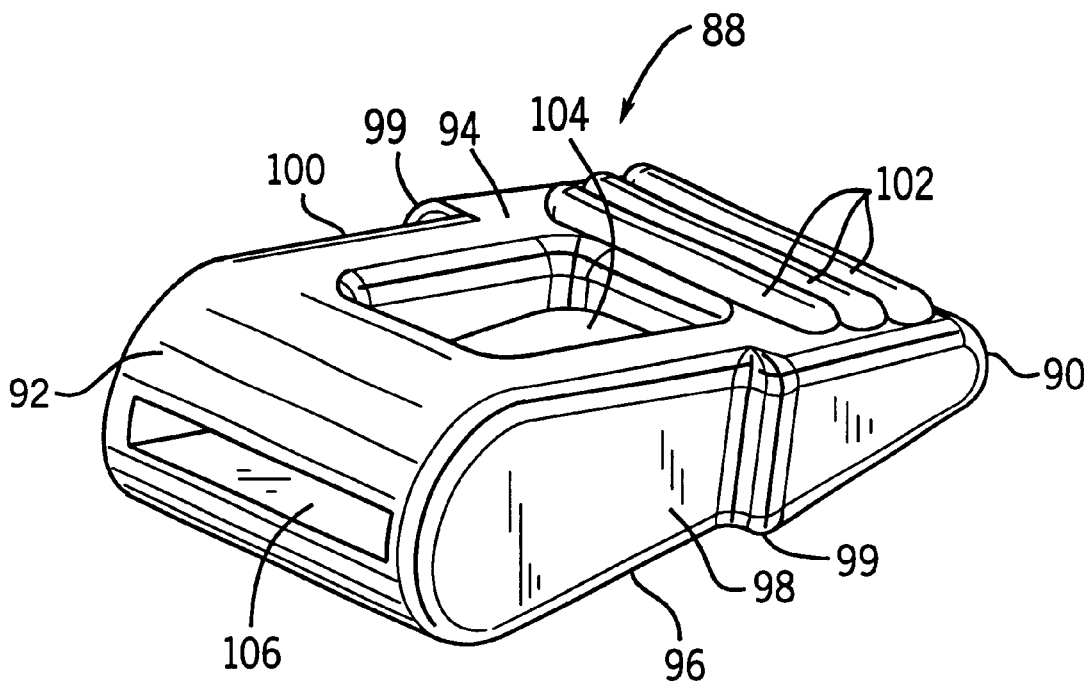
FIG. 10 is a top rear perspective view of the fish tape end piece of FIG. 1.
Figure 11:
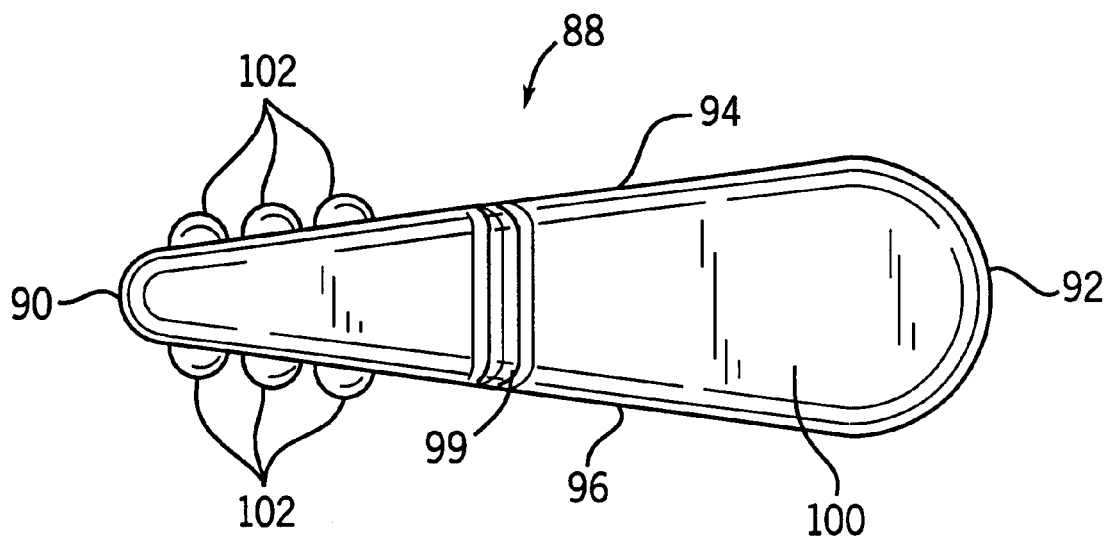
FIG. 11 is a side view of the fish tape end piece of FIG. 10.

Looking particularly at FIGS. 10 and 11, the end piece 88 is wedge shaped having a thin rounded leading edge 90, and a thick rounded trailing edge 92 connected by angled top and bottom walls 94, 96. The wedge shape separates surfaces, such as between a carpet and floor, when the tape is pushed along a desired path. Opposing sidewalls 98, 100 connecting the top and bottom walls 94, 96 are stepped to provide a wider leading edge 90 than the trailing edge 92.

Ridges 102 formed on the top and bottom walls 94, 96 proximal the leading edge 90 reduce friction when the end piece 88 is forced between the surfaces, and also make it easier to grip the end 88 when pulling the fish tape 16 out of the assembly 10. An aperture 104 formed through the end piece 88 from the top wall 94 to the bottom wall 96 provides an attachment point for wires or string.

The stepped sidewalls 98, 100 form shoulders 99 which secure wire inserted through the aperture and wrapped around the end piece walls 94, 96, 98, 100. The shoulders 99 prevent the wire from slipping off of the end piece 88 when the tape 16 is retracted back toward the assembly 10.

A slot 106 formed in the end piece trailing edge 92 receives the fish tape end 86. In the embodiment illustrated, the end piece 88 is insert injection molded on the end of the fish tape 16. The end piece 88 could, however, be separately molded, and subsequently attached to the fish tape end 86 with an adhesive or other means. If insert molded, the tape end 86 has a hole in it through which plastic of the end piece 88 flows to create opening 104, and a mechanically interlocking connection of end piece 88 with the metal end of the tape 16.

Referring to FIGS. 1–11, in use, the fish tape 16 is dispensed from the reel assembly 10 by pivoting the cassette handle 76 to the unlocked position, and then rotating the cassette 12 with the knob 82 to unwind the tape 16. Alternatively, the tape 16 can be pulled from the cassette 12, which freely rotates in the unlocked position.

The free end of the tape 16 having the end piece 88, is guided along the desired path by the user. When the path includes traversing between surfaces, the end piece 88 creates a path by separating the surfaces with the wedge shape.

In the unlocked position, the tape 16 is wound back onto the cassette 12 by grasping the cassette handle knob 82, and moving it in a circular path in a direction opposite to that used to unwind the tape 16. If the tape 16 is snagged, the cassette handle 76 is pivoted to the locked position, and the user grasps the housing handle 24 to pull the tape 16 loose. Once the tape 16 is loose, the user pivots the cassette handle 76 back to the unlocked position to continue reeling in the tape 16.

While there has been shown and described a preferred embodiment of the invention, it will be obvious to those skilled in the art that various changes and modifications can be made therein without departing from the scope of the invention defined by the appended claims.

What is claimed is:

1. A fish tape reel assembly, comprising;

a housing having a backwall and a peripheral wall extending from said backwall to define an outwardly facing cavity having a center;

a carrying handle fixed to said peripheral wall;

a fish tape cassette rotatably mounted in said cavity for rotation about said cavity center, and having a hub, an outer wall extending radially from said hub, and an inner wall extending radially from said hub and spaced from said outer wall, said outer wall including an outwardly facing surface facing away from said backwall;

a cassette handle mounted to said fish tape cassette outwardly facing surface for manually rotating said cassette about said cavity center to wind or unwind said fish tape; and a fish tape wound around said cassette hub between said cassette walls, and having one end secured to said cassette, and an opposite end extending outside of said cassette having a feed direction.

2. The fish tape reel assembly as claimed in claim 1, in which said cassette handle engages said carrying handle to prevent rotation of said cassette in a locked position.

3. The fish tape reel assembly as claimed in claim 2, in which said cassette handle is pivotally mounted to said cassette outwardly facing surface for pivotal movement of said cassette handle between an unlocked position and said locked position.

4. The fish tape reel assembly as claimed in claim 1, in which said fish tape is a flat metal strip.

5. The fish tape reel assembly as claimed in claim 1, including a wedge shaped end piece affixed to said opposite end, said end piece including a leading edge; a trailing edge thicker than said leading edge for attachment to a fish tape end; and a top wall and bottom wall joining said leading and trailing edges to define the wedge shape of said end piece.

6. The fish tape reel assembly as claimed in claim 1, which said carrying handle includes a grip substantially perpendicular to said feed direction.

7. The fish tape reel assembly as claimed in claim 6, including a fish tape guide extending through said housing peripheral wall for guiding fish tape from said cassette substantially parallel to said feed direction.

* * * * *